Oct. 29, 1940.  H. B. LEE  2,219,324
VALVE
Filed Aug. 1, 1938  2 Sheets-Sheet 1

INVENTOR
Henry B. Lee
by
ATTORNEY

Oct. 29, 1940.  H. B. LEE  2,219,324
VALVE
Filed Aug. 1, 1938  2 Sheets-Sheet 2
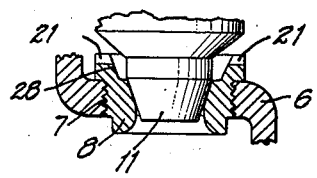
Fig. 7
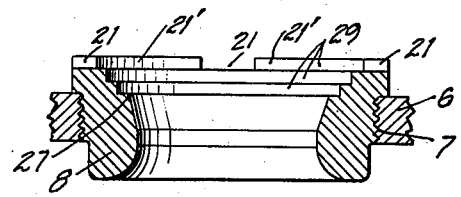
Fig. 9
Fig. 11
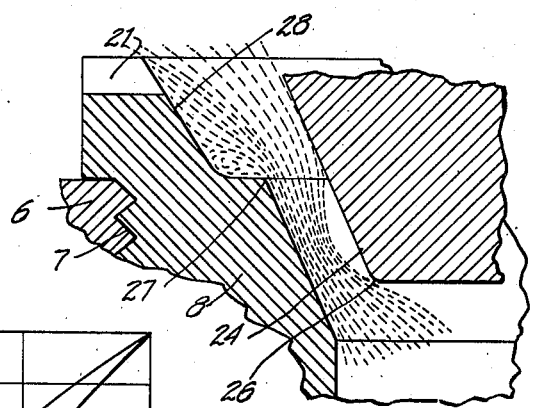
Fig. 8
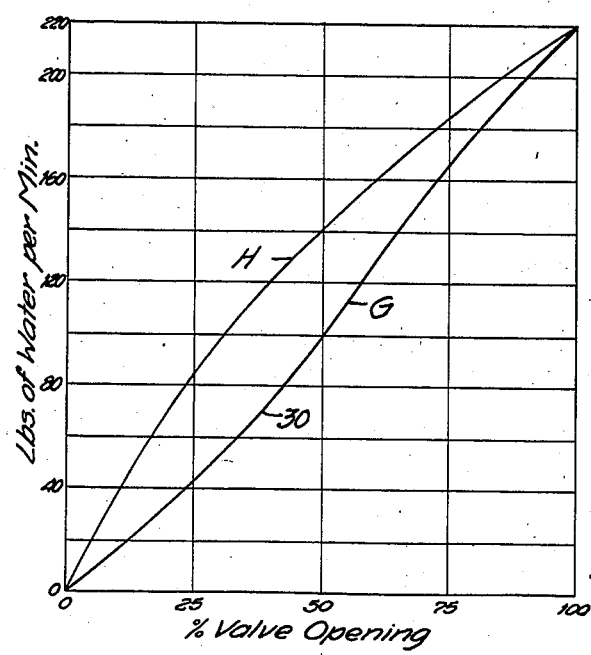
Fig. 10
INVENTOR
Henry B. Lee
by
ATTORNEY Patented Oct. 29, 1940

2,219,324

UNITED STATES PATENT OFFICE 2,219,324

VALVE

Henry B. Lee, Troy, N. Y., assignor to The Ludlow Valve Manufacturing Co., Inc., Troy, N. Y., a corporation of New York Application August 1, 1938, Serial No. 222,336

18 Claims. (Cl. 251—27)

My invention relates to globe valves designed to regulate and control the flow of fluids through pipe lines, and particularly to a replacement valve seat and plug combination therefor of such type as to provide, among other things, better flow control, extremely high flow capacity when wide open, a maximum resistance to erosion, and which will be interchangeable with the common globe valve seat and plug assemblies and have substantially the same valve stroke.

Manufacturers of globe valves now find it necessary to provide one type of valve-valve seat combination where the valve is intended for use as a throttle or control valve, and another, quite different type of valve-valve seat combination where the valve is intended merely as a full-way and shut-off valve. The so-called full-way type has a standard poppet valve and seat and is useless for throttling or control purposes, while the throttle or control type has a restricted passageway through the valve seat and is useless as a full-way valve because its full flow capacity, due to the restriction, is very much less than that attained through the full-way type. In all full-way globe valves, the quantities of fluid which are permitted to flow therethrough are not even approximately proportional to the degree of valve opening, and hence fine flow control is impossible. In common poppet type globe valves of the full-way type wherein the valve member is adapted to seat against the end of a cylindrical valve seat ring, equal increments of movement of the valve member from its seat, effect progressively smaller increases in fluid flow. A standard full-way globe valve, for example, will pass 80% of its full capacity when the valve is opened only ¼ of the stroke. This is due largely to the high differential pressure at the beginning of valve opening and the rapid reduction in differential pressure as the valve is opened. In other words, fractional valve openings do not permit corresponding fractional portions of full flow capacity to pass therethrough and the flow-regulation of these valves is poor for all practical purposes where fine control is desirable. Moreover, this type of seat erodes very quickly when the valve is only partially open and is soon destroyed by the formation therein of deep wire-drawn grooves. Such valves, however, perform well when wide open, and they are universally known as standard globe valves.

To overcome these disadvantages and to provide a valve which can be used for throttling purposes, it is customary to provide a valve seat which is frusto-conical in form and which is closed by means of a complementary, frusto-conical plug. Such frusto-conical seats, in order to be installed in the available space found in standard globe valves have the large diameter of cone frustum equal to or slightly larger than the diameter of the pipe with which the valve is used, and the small diameter of cone frustum less than the pipe diameter. The cross sectional area of the smaller end of the valve seat cone frustum is usually only about 50% of the pipe area. These frusto-conical types of valve seat have been found to provide much better flow control and to be more resistant to erosion than standard poppet type seats because the reduced cross sectional area of the fluid passage through the seat necessitates a wider opening for a given flow, and with the seating surfaces thus spaced, solids in the fluid stream do less damage to the seats. Furthermore, because the valve must be opened wider than the standard poppet valve for a given flow, the fluid velocity past the seating surfaces is much less. Fairly good throttling characteristics are attained in this manner, but the utility of the valve as a full-way valve is destroyed because of its extremely limited maximum flow capacity when wide open.

Another objection to both above mentioned valves and also to all types of poppet and frusto-conical valves is the characteristic of the flow which is not even approximately proportional to the valve opening. Throughout the first half of the valve movement the fluid flow is proportionally greater, and throughout the last half proportionally less than the valve movement. This is undesirable because the differential pressure across the valve is greater at the beginning of valve opening and very much less at wide open position of valve. The ideal flow characteristic is the reverse of that of the present valves, or, in other words, one in which the fluid flow is proportionally less throughout the first half of valve opening movement and proportionally greater throughout the last half of the valve opening movement.

The principal object of my invention therefore is to provide, in a single unit, a globe valve of such design that it is capable of functioning both as a full-way valve and as a throttle or control valve, and in which the flow of fluid therethrough from zero up to substantially the full capacity of the valve will be approximately a simple function of the valve opening or, in other words, a throttling or control valve in which the quantity of fluid passing through the valve will vary with the degree of valve opening in the ideal manner, as above set forth. Another object is to provide a plug and seat combination which will accomplish the foregoing results and which is interchangeable with and therefore may be substituted for the plug-seat combination in a standard globe valve. A further object is to provide a valve having the foregoing characteristics but in which the erosion will be very substantially less than that in the present type of valves. In short, I aim to provide, in a single unit, a globe valve which will not only perform all of the functions for which valve manufacturers now consider it necessary to supply two or more valve units, but which will perform some of these functions, notably the throttling function, in a much improved way. Furthermore, I accomplish this end by changing the plug and valve seat combination in a standard globe valve and without otherwise modifying the universally accepted standard valve in any way whatsoever.

I attain these ends by the means described below and illustrated in the accompanying drawings in which—

Fig. 7 is a fragmentary, elevation view partially in section showing my preferred form of plug-seat combination;

Fig. 8 is a fragmentary enlarged sectional elevation of the preferred plug-seat combination showing the valve partially open;

Fig. 9 is a sectional elevation view of a modified form of my preferred valve seat;

Fig. 10 is a diagram showing in a comparative manner the flow characteristics of a valve equipped with the valve seat combination shown in Figs. 1 and 2 with those of a valve equipped with the plug-seat combination shown in Figs. 7 and 8;

Fig. 11 is a cross section of a modified form of seat ring.

Figure 1:
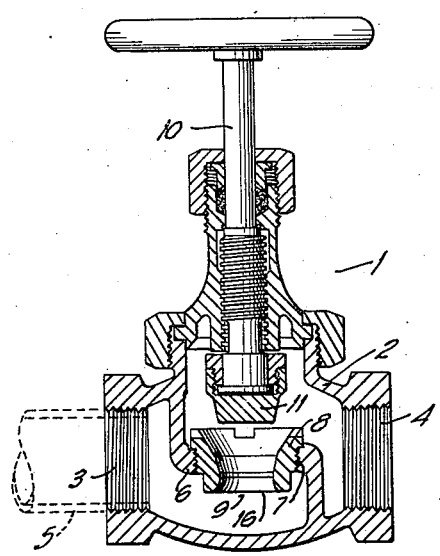
Fig. 1 is an elevation view, in section, of a standard type of globe valve equipped with my plug and seat combination.

Referring to the drawings, 1 represents a standard globe valve having the body 2 provided with threaded openings 3 and 4 for the attachment of inlet and outlet pipes, one of which is shown in dotted outline at 5. The usual diaphragm 6 is cast integral with the body 2 and may be said to separate the inlet from the outlet side of the valve. The diaphragm is provided with the threaded passage 7 adapted to receive the valve seat ring 8. This valve seat or ring is of somewhat greater length than the seat of a standard globe valve and extends downwardly, past the diaphragm and somewhat into the inlet chamber of the valve as shown at 9. The configuration of the passage through this valve seat ring is of the utmost importance and will be hereinafter described in detail. The valve is provided with the usual threaded stem 10 which carries, at its lower end, a plug 11 a portion of which is complementary in shape to the interior of the valve seat and which also will be described in detail below.

Figure 2:
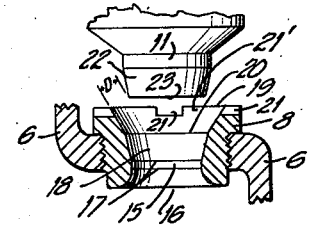
Fig. 2 is a fragmentary elevation view, partially in section, of a plug and seat.
Figure 3:
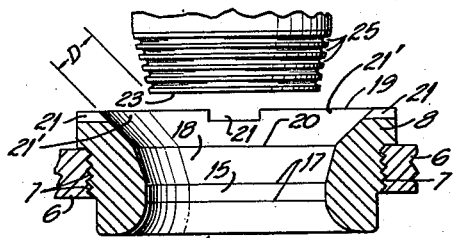
Fig. 3 is a view similar to Fig. 2 but to an enlarged scale and showing a modified type of plug.

Referring particularly to Figs. 2 and 3 which, for clearness, are drawn to a somewhat larger scale than Fig. 1, I will now describe the details of the seat.

Figures 4, 5:
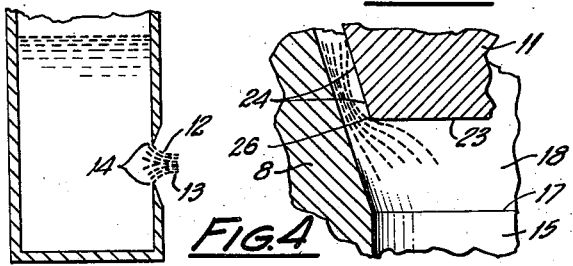
Fig. 4 is a fragmentary sectional elevation to an enlarged scale and showing the plug only slightly moved from its seat.
Fig. 5 is a vertical section through a tank of liquid showing the shape or configuration of a jet issuing from a thin plate or sharp edged orifice in the side thereof.

The shape or configuration of a jet of fluid 12 issuing from a thin plate or sharp edged orifice, such as shown in Fig. 5, is well known. The issuing jet, just beyond the orifice, contracts, as shown at 13, and the cross sectional area of the most contracted portion of the jet, termed the vena contracta, is approximately 58% of the cross sectional area of the orifice 14 when the jet is issuing at substantial velocity. In designing the interior shape of the valve seat ring 8 which is secured in the diaphragm 6 it is preferably desirable to shape the inlet end thereof so that it conforms approximately in shape to the shape assumed by that portion of a jet of fluid issuing at pipe line velocities from a thin plate orifice of about the same diameter as the pipe 5 with which the valve is to be used and which is included between said orifice and the vena contracta in said jet. In other words, the minimum cross sectional area of the fluid passage through the ring 8, and which is located in the zone 15, preferably approximates the cross sectional area of such a vena contracta. This zone of minimum cross sectional area is spaced inwardly from the inlet end 16 of the valve seat ring a distance approximating the distance between the orifice and the vena contracta, and the walls defining the inlet end of the ring diverge outwardly therefrom on a smooth curve preferably approximating the surface of the jet. The zone of minimum cross sectional area instead of being confined to a mere plane is preferably a short cylinder extending between the lines 17. This, in connection with the vena contracta-shaped fluid entrance forms a nozzle which creates a jet of such high velocity that, even though it be restricted so that its minimum cross sectional area is but 50% of the area of the pipe, I have found it will pass as much fluid as the passage in a full way globe valve seat. The energy of this jet is used to force the stream against the flat bottom 23 of the plug which guides and forces the stream through the space between the plug and seat. Immediately above the zone of minimum cross sectional area, is the frusto-conical, sealing seat proper 18 in which the included angle at the vertex of the cone is preferably about 30° which is considered a self-releasing angle or taper for the plug, and is the usual angle, although the invention is not so limited. In practice, it will be found, with a valve ring of my design, that there is space enough in a standard globe valve to provide a sealing seat which will be considerably longer or deeper than the standard poppet type seat. I consider this an important feature because it prevents wire drawing to a remarkable degree. Yet this seat should not be too long. If too long, a condition prevails which increases the velocity during partial valve openings and creates what in hydraulic practice is known as a "compound tube effect" whereby the flow through the restricted zone may have a flow coefficient as high as 2.4. Therefore, the shorter the sealing seat the lower will be the fluid velocity at partial valve openings. Between the outlet end 19 of the ring and the top 20 of the sealing seat proper, the interior surface of the ring, in the embodiment shown in Figs. 1, 2 and 3, flares rapidly outwardly. This flared outlet end of the ring is not necessarily frusto-conical, but from a construction standpoint it may be conveniently made in this form; the purpose being to increase sharply the diameter of the fluid passage at the outlet of the sealing seat to prevent a "compound tube" condition. The minimum distance D between the plug and the interior of the outlet end of the valve seat ring should, in any case, be such as to provide a passageway having an area at least equal to the cross sectional area of the attached pipe if full-way capacity is desired. The energy of the jet of fluid issuing from the nozzle-like passage through the valve seat ring is utilized to force the stream of fluid through the annular passage between the plug and the ring and, so efficiently is this energy used, that actual tests show that the area of this annular passage may even be somewhat less than the pipe area. However, it will be obvious that the larger the area of this annular passage the easier solids in the fluid will pass therethrough.

The outlet end of the valve seat ring 8 is castellated or provided with slots 21 and projections 21' adapted to cooperate with a special tool for inserting and removing the valve seat.

Standard globe valves are provided with driving lugs located in the passageway in the valve seat ring and immediately below the sealing seat. These lugs restrict the flow of fluid and, in order to compensate therefor, it is necessary to increase the cross section area of the passage through the seat in order to obtain full flow. Globe valves having a frusto-conical fluid passage through the valve seat ring also have means for driving the seats in and out which are located in the flow way and which restrict the free flow of fluid through the valve.

Instead of slotting the outlet end of the valve seat ring, the zone 15 which is shown as cylindrical in Figs. 1, 2, 3, 4, 7, 8 and 9 may be made polygonal, preferably octagonal, as shown at 15' in Fig. 11 so that a wrench may be inserted for the purpose of screwing or unscrewing the valve seat ring from the diaphragm.

The plug 11 is provided with a frusto-conical surface 22 which is complementary in shape to the seating surface 18 in the valve seat ring or, in other words, forms part of a cone having the same vertex angle as the seat ring cone. The bottom 23 of the plug 11 is preferably, but not necessarily, flat, and while the intersection of the bottom with the seating surface of the plug may be sharp, it is preferably very slightly chamfered, as shown at 26. The frusto-conical surface 22 is also made slightly longer than the ring seat and projects into the inlet zone when the valve is closed. The bottom of the plug, in addition to deflecting the fluid into the valve flow-way when the valve is wide open, also provides the greatest possible throttling or restriction to fluid flow when the valve is partially open. Furthermore, the sharp or slightly chamfered edge on the plug serves to reduce erosion and wire drawing. By reference to Figs. 4 and 8, which show the valve in partially closed position, it will be noted that the edge 23 of the plug defines one side of the annular passage between the plug and the valve seat so that the fluid flow is directed away from the side of the plug in the zone 24, thus forming an annular vena contracta in the fluid jet. It should be noted that the effective area of the passage, in so far as fluid flow therethrough is concerned, is the cross sectional area of the annular vena contracta which is substantially less than the actual cross sectional area of the passage. Thus, the throttling characteristics of the valve with partial valve openings are improved and, for a given flow, the valve must be opened wider than would otherwise be necessary, thus positioning the sealing surfaces farther apart which allows solids to pass therethrough with minimum damage to the seats.

In Figs. 7 and 8 I have shown my preferred type of valve seat ring. Here, there is an abrupt enlargement of the fluid passage through the valve seat ring at the outlet end 27 of the seating surface and, following the abrupt enlargement, the cross sectional area of the passage increases rapidly to the outlet end of the ring, as shown at 28. Between the outlet end of the seating surface and the outlet end of the ring the passage may be frusto-conical, as shown in Figs. 7 and 8, or may be broken up into a series of cylindrical passages or steps, as shown at 29 in Fig. 9. This abrupt enlargement of the fluid passage described above, has a very marked effect on the flow characteristics of the valve, as shown in curve G in Fig. 10. For comparative purposes a curve H, showing the flow characteristics of a valve having a seat of the type shown in Figs. 1, 2 and 3 is plotted with curve G. While the curve H, like curves A, B, C and F of Fig. 6 which show the flow characteristics through a valve having a seat of the same type but are plotted to a different scale, is quite flat and may therefore be said to approximate a straight line, it is, nevertheless, concave on its lower side throughout the entire extent thereof. On the other hand, the portion 30 of the curve G between 0% and about 50% valve opening is concave on its upper side and, from 50% valve opening to full valve opening the curve G, although slightly concave on its lower side, is almost a straight line.

It is sometimes desirable that valves allow full flow in either direction and, to accomplish this, the corner 27 may be slightly rounded.

Paradoxical as it may seem, the abrupt enlargement in the fluid passage through the valve as described above functions to reduce the flow through the valve, as shown by the curve G, for partial valve opening, due to the elimination of any "compound tube effects" when the valve is functioning as a throttle valve. In other words, it will be noted that throughout the first half of the valve opening movement the flow is proportionately less than the extent of the valve opening, which is an extremely desirable characteristic and exactly the reverse of all valves of which I am aware.

Instead of using a plain surface frusto-conical plug such as shown in Figs. 1, 2, 4, 7 and 8 I may, where exceptionally fine throttling characteristics are desired, employ with any of the seats shown, a plug having a plurality of grooves 25 in the seating surface thereof, as shown in Fig. 3. These grooves form a plurality of expansion chambers which further prevent a "compound tube effect" if used on water service and, in steam service, prevent the steam from expanding adiabatically and thus prevent a very high velocity of expanding steam.

Figure 6:
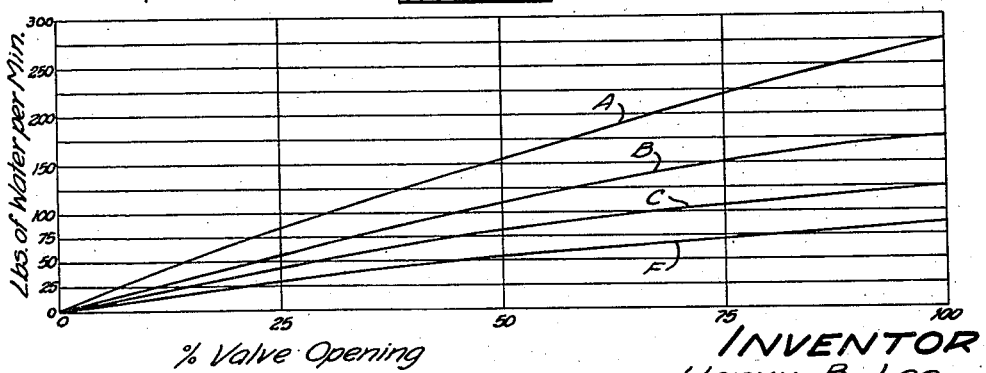
Fig. 6 is a diagram showing how the passage of water through my valve shown in Figs. 1 to 4 varies with the valve opening.

Curves A, B, C and F in Fig. 6 show the quantities of water discharged through a valve, having a valve seat of the type shown in Figs. 1, 2 and 3, with various valve openings and at different pressure drops through the valve. The pressure drops per square inch were as follows:

| Curve | Pounds |
|---|---|
| Curve A | 18.0 |
| Curve B | 9.5 |
| Curve C | 6.3 |
| Curve F | 2.8 |

It will be noted that, while these flow curves are convex on the top, they are almost straight lines and substantially identical except for differences in the general pitch or slope thereof, thus indicating that the throttling characteristics of the valve are independent of the pressure drop through the valve.

From a consideration of my design, and particularly the valve seat rings shown in Figs. 7, 8 and 9, it will be noted that I provide the greatest possible restriction to fluid flow when the valve is used as a throttle valve and in the partially opened position. In this case the pressure differential across the valve is a maximum. On the other hand, the design is such that it offers the least possible resistance to fluid flow when the valve is in wide open position and the pressure differential across the valve is a minimum.

While I believe that making the minimum cross sectional area of the valve seat ring say from about 50% to about 60% of the cross section of the pipe will meet the demand for most valve installations and where a universal service valve adapted to function as a shut off, throttle or control is desired, there are some special installations where a heavy pressure reducing type of valve is required. That is to say, a valve which is required to hold back fluid under a very high pressure on the inlet side and produce a lower pressure on the outlet side. In such a case the minimum cross sectional area through the valve seat may be made somewhat less than 50% of the pipe area to effect the desired restricting capacity combined with the wide open capacity of a standard globe valve. In other words, it is to be understood that the minimum cross sectional area used in the valve seat ring may be varied to provide whatever restriction is desired under special circumstances, and yet, due to the design of the plug-ring combination, the valve, when wide open, will offer a minimum resistance to fluid flow with maximum resistance to erosion and wire drawing when used for throttling.

From the foregoing, it will be apparent that any standard full-way globe valve may be changed to a combination full-way and throttle valve of the same or slightly greater maximum flow capacity or, any standard globe valve of the throttling or control type may not only be endowed with improved throttling characteristics and, at the same time, be adapted for use as a full-way valve with greatly increased maximum flow capacity, by merely removing the plug and seat and replacing them with my improved type of valve-valve seat combination.

What I claim is:

1. A valve comprising a frusto-conical plug, a body provided with a fluid inlet and outlet therein, a diaphragm in said body between said inlet and outlet provided with a fluid passage therethrough, the central zone of said passage being the frustum of a conical surface forming a seat for said plug and having the included angle at the vertex of said surface substantially less than 90°, said passage at the inlet end thereof being of substantially greater diameter than at the smaller end of said seat and having the edge of the inlet opening rounded to form a smoothly-converging entrance for the flow of fluid into said passage, the diameter of said passage increasing sharply and rapidly from the larger end of said seat towards the outlet end of said passage and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

2. A valve comprising a frusto-conical plug, a body provided with a fluid inlet and outlet therein, a diaphragm in said body between said inlet and outlet provided with a fluid passage therethrough, the central zone of said passage being the frustum of a conical surface forming a seat for said plug and having the included angle at the vertex of said surface substantially less than 90°, the inlet end portion of said passage conforming approximately in shape to that portion of the surface of a jet of water issuing from a sharp-edged orifice and having a vena contracta therein of about the same diameter as the smaller end of said seat which is included between said orifice and said vena contracta; the diameter of said passage increasing sharply and rapidly from the larger end of said seat towards the outlet end of said passage and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

3. A valve comprising a frusto-conical plug, a body provided with a fluid inlet and outlet therein, a diaphragm in said body between said inlet and outlet provided with a fluid passage therethrough, the central zone of said passage being the frustum of a conical surface forming a seat for said frusto-conical plug and having the included angle at the vertex of said surface substantially less than 90°, said passage at the inlet end thereof being of substantially greater diameter than at the smaller end of said seat and having the edge of the inlet opening rounded to form a smoothly-converging entrance for the flow of fluid into said passage, and the diameter of said passage increasing abruptly at the larger end of said seat and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

4. A valve comprising a frusto-conical plug, a body provided with a fluid inlet and outlet therein and means adapting said valve to be connected to a pipe, a diaphragm in said body between said inlet and outlet provided with a fluid passage therethrough, the central zone of said passage being the frustum of a conical surface forming a seat for said frusto-conical plug and having the included angle at the vertex of said surface substantially less than 90°, the inlet end portion of said passage conforming approximately in shape to that portion of the surface of a jet of water issuing from a sharp-edged orifice and having a vena contracta therein of about the same diameter as the smaller end of said seat which is included between said orifice and said vena contracta; and the diameter of said passage increasing abruptly at the larger end of said seat and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

5. A valve comprising a frusto-conical plug, a body provided with a fluid inlet and outlet therein, a diaphragm in said body between said inlet and outlet provided with an opening therein, a one-piece valve seat ring secured in said opening and forming a passage for the flow of fluid therethrough, the central zone of said passage being the frustum of a conical surface forming a seat for said plug and having the included angle at the vertex of said surface substantially less than 90°, said passage at the inlet end thereof being of substantially greater diameter than at the smaller end of said seat and having the edge of the inlet opening rounded to form a smoothly-converging entrance for the flow of fluid into said passage, the diameter of said passage increasing sharply and rapidly from the larger end of said seat towards the outlet end of said passage and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

6. A valve comprising a frusto-conical plug, a body provided with a fluid inlet and outlet therein, a diaphragm in said body between said inlet and outlet provided with an opening therein, a one-piece valve seat ring secured in said opening and forming a passage for the flow of fluid therethrough, the central zone of said passage being the frustum of a conical surface forming a seat for said plug and having the included angle at the vertex of said surface substantially less than 90°, the inlet end portion of said passage conforming approximately in shape to that portion of the surface of a jet of water issuing from a sharp-edged orifice and having a vena contracta therein of about the same diameter as the smaller end of said seat which is included between said orifice and said vena contracta; the diameter of said passage increasing sharply and rapidly from the larger end of said seat towards the outlet end of said passage and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

7. A valve comprising a frusto-conical plug, a body provided with a fluid inlet and outlet therein, a diaphragm in said body between said inlet and outlet provided with an opening therein, a one-piece valve seat ring secured in said opening and forming a passage for the flow of fluid therethrough, the central zone of said passage being the frustum of a conical surface forming a seat for said frusto-conical plug and having the included angle at the vertex of said surface substantially less than 90°, said passage at the inlet end thereof being of substantially greater diameter than at the smaller end of said seat and having the edge of the inlet opening rounded to form a smoothly-converging entrance for the flow of fluid into said passage, and the diameter of said passage increasing abruptly at the larger end of said seat and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

8. A valve comprising a frusto-conical plug, a body provided with a fluid inlet and outlet therein, a diaphragm in said body between said inlet and outlet provided with an opening therein, a one-piece valve seat ring secured in said opening and forming a passage for the flow of fluid therethrough, the central zone of said passage being the frustum of a conical surface forming a seat for said frusto-conical plug and having the included angle at the vertex of said surface substantially less than 90°, the inlet end portion of said passage conforming approximately in shape to that portion of the surface of a jet of water issuing from a sharp-edged orifice and having a vena contracta therein of about the same diameter as the smaller end of said seat which is included between said orifice and said vena contracta; and the diameter of said passage increasing abruptly at the larger end of said seat and being substantially greater at the outlet end than at the larger end of said seat to prevent a "compound tube effect" in said passage at partial valve openings; whereby to provide a valve having a high rate of fluid flow therethrough when fully open and a rate of fluid flow therethrough at substantially all partial valve openings which is approximately directly proportional to the valve opening.

9. A replaceable plug and seat ring assembly for a globe valve having a diaphragm therein provided with a threaded opening extending therethrough in which the seat ring is threaded, said assembly comprising a frusto-conical plug, and a one piece seat ring having an overall length in excess of the thickness of said diaphragm and provided with a threaded exterior adapted to cooperate with said threaded opening, the interior of said ring at the fluid inlet end thereof conforming approximately in shape to that portion of the surface of a jet of water issuing from a sharp-edged orifice and having a vena contracta therein of about the same diameter as the minimum diameter of the interior of said ring is included between said orifice and said vena contracta, and the interior of said ring extending from the zone of minimum diameter thereof towards the fluid outlet end being a frusto-conical surface having the included angle at the vertex substantially less than 90° and forming a seat for said plug; whereby said assembly may be substituted for the plug and seat assembly of a globe valve of the throttling type having a fluid passage through the seat thereof of a minimum diameter approximating the diameter of said vena contracta to endow said valve with the maximum flow characteristics when fully open of a full way globe valve of the same size without impairing the throttling characteristics thereof.

10. The structure set forth in claim 1 in which the bottom of the frusto-conical plug is flat.

11. The structure set forth in claim 2 in which the bottom of the frusto-conical plug is flat.

12. The structure set forth in claim 3 in which the bottom of the frusto-conical plug is flat.

13. The structure set forth in claim 4 in which the bottom of the frusto-conical plug is flat.

14. The structure set forth in claim 5 in which the bottom of the frusto-conical plug is flat.

15. The structure set forth in claim 6 in which the bottom of the frusto-conical plug is flat.

16. The structure set forth in claim 7 in which the bottom of the frusto-conical plug is flat.

17. The structure set forth in claim 8 in which the bottom of the frusto-conical plug is flat.

18. The structure set forth in claim 9 in which the bottom of the frusto-conical plug is flat.

HENRY B. LEE.

CERTIFICATE OF CORRECTION.

Patent No. 2,219,324. October 29, 1940.

HENRY B. LEE.

It is hereby certified that error appears in the printed specification of the above numbered patent requiring correction as follows: Page 5, second column, line 68, claim 9, after the word "ring" insert --which--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.